United States Patent
Ahuja et al.

(10) Patent No.: US 6,175,869 B1
(45) Date of Patent: Jan. 16, 2001

(54) CLIENT-SIDE TECHNIQUES FOR WEB SERVER ALLOCATION

(75) Inventors: Sudhir Raman Ahuja, Aberdeen, NJ (US); Mehmet Karaul; Ioannis A. Korilis, both of New York, NY (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/057,274

(22) Filed: Apr. 8, 1998

(51) Int. Cl.[7] ............................ G06F 15/173; G06F 9/00; G06F 15/16

(52) U.S. Cl. ...................... 709/226; 709/203; 709/105

(58) Field of Search .................... 709/201, 202, 709/203, 219, 226, 105

(56) References Cited

U.S. PATENT DOCUMENTS

| | | | |
|---|---|---|---|
| 5,283,897 | * 2/1994 | Goergiadis et al. | 709/105 |
| 5,459,837 | * 10/1995 | Caccavale | 709/226 |
| 5,774,660 | * 6/1998 | Brendel et al. | 706/201 |
| 5,852,717 | * 12/1998 | Bhide et al. | 709/203 |
| 5,893,077 | * 4/1999 | Griffin | 705/34 |
| 5,987,493 | * 11/1999 | Rangan et al. | 709/105 |
| 5,991,808 | * 11/1999 | Broder et al. | 709/226 |
| 6,014,307 | * 5/2000 | Ahuja et al. | 705/8 |
| 6,056,046 | * 5/2000 | Feinberg et al. | 709/216 |
| 6,067,545 | * 5/2000 | Wolff | 707/10 |
| 6,070,190 | * 5/2000 | Reps et al. | 709/224 |
| 6,070,191 | * 5/2000 | Narendran et al. | 709/226 |
| 6,078,960 | * 6/2000 | Ballard | 709/229 |

OTHER PUBLICATIONS

C. Yoshikawa, B. Chun, P. Eastham, A. Vahdat, T. Anderson and D. Culler, "Using Smart Clients to Build Scalable Services," Proceedings of USENIX 1997 Annual Technical Conference, Anaheim, California, Jan. 6–10, 1997.

E. Anderson, D. Patterson and E. Brewer, "The Magicrouter, an Application of Fast Packet Interposing," Symposium on Operating Systems Design and Implementation, OSDI, 1996, <http://www.cs.berkeley.edu/~eanders/magicrouter/osdi96–mr–submission.ps>.

IBM Interactive Network Dispatcher (IND) User's Guide, Chapter 1, "Introducing IBM's Interactive Network Dispatcher," pp. 1–13, 1997.

(List continued on next page.)

Primary Examiner—Zarni Maung
Assistant Examiner—Andrew Caldwell
(74) Attorney, Agent, or Firm—Ryan, Mason & Lewis, LLP

(57) ABSTRACT

A client request directed to a web site or other service hosted by a distributed pool of servers is processed by a client agent associated with the client. The client agent intercepts the client request and routes it to a particular one of the servers in the pool. The client agent bases its routing decision on address information regarding the individual servers of the pool and performance data regarding processing of previous client requests directed to the service. The address information may be retrieved by the client agent from a response to an initial client request directed to the service. The performance data may include response times for servicing previous client requests directed to the service, and the client agent may route the client request such that an average response time of multiple requests to the service is minimized. It may also make use of a probabilistic routing strategy which ensures that each of the servers in the pool receives at least one client request, such that accurate performance data may be maintained for all of the servers. A pricing manager associated with the server pool may be used to establish discount factors or other pricing information for each of the servers in the pool. This pricing information is communicated to the client agents and used in their routing decisions, so as to ensure that otherwise non-cooperating client agents will route their requests in a manner consistent with a target operating point established by the service provider.

47 Claims, 6 Drawing Sheets

OTHER PUBLICATIONS

D. Anderson, T. Yang and O.H. Ibarra, "Towards a Scalable World Wide Web Server on Workstation Clusters,"<http://www.cs.uscb.edu/research/>, 1997.

T. Brisco, "DNS Support for Load Balancing," Network Working Group, RFC 1794, <http://andrew2.andrew.cmu.edu/rfc/rfc1974.html>.

K. Egevang and P. Francis, "The IP Network Address Translator," Network Working Group, RFC 1631, <http://www.safety.net/rfc1631.tx>.

Om P. Damani et al., "ONE–IP: Techniques for Hosting a Service on a Cluster of Machines," Sixth International World Wide Web Conference,<http://www6.nttlabs.com/HyperNews/get/PAPER196.html>, 1997.

J.H. Howard et al., "Scale and Performance in a Distributed File System," ACM Transactions on Computer Systems, 6(1):51–81, Feb. 1988.

Y.A. Korilis et al., "Architecting Noncooperative Networks," IEEE Journal on Selected Areas in Communication, 13(8):1–12, 1995.

Y.A. Korilis et al., "Optimal Pricing Strategies in Noncooperative Networks," Proc. of the 5$^{th}$ International Conference on Telecommunication Systems: Modeling and Analysis, pp. 110–123, Nashville, TN, Mar. 1997.

Y.A. Korilis et al., "Pricing Noncooperative Networks," pp. 1–40, <http.www.multimedia.bell–labs.com/people/yannisk/price.html>, 1997.

K.C. Claffy et al., "Tracking Long–Term Growth of the NSFNET," Communications of the ACM, 37(8):34–45, Aug. 1994.

* cited by examiner

CLIENT-SIDE TECHNIQUES FOR WEB SERVER ALLOCATION

FIELD OF THE INVENTION

The present invention relates generally to computer systems for use in processing client requests received over communication networks such as the Internet and more particularly to client-side techniques for processing client requests in a computer system including a pool of replicated servers.

BACKGROUND OF THE INVENTION

Due to the rapid growth of the World Wide Web, many web sites are experiencing overload conditions, which leads to very slow response times for servicing incoming user requests. Increased network congestion amplifies this performance degradation as seen by the clients. In order to accommodate the increasing request load, many web sites have been implemented in the form of a cluster or "pool" of replicated web servers. The network congestion problem is often alleviated by geographically distributing the replicated servers of the server pool. FIG. 1 shows a distributed server computer system 10 in which a number of clients 12-i communicate with servers 14-j over a communication network 16 such as the Internet. The servers 14-j in the system 10 represent a pool of replicated servers corresponding to a particular web site. In this illustration, the server pool includes five distinct servers 14-1 through 14-5 arranged as shown. The servers 14-1, 14-2 and 14-3 form a geographically co-located group 18, while the servers 14-4 and 14-5 are geographically distributed relative to each other and the group 18. This type of distributed server architecture can result in increased service availability in times of high network congestion, and can improve performance by taking advantage of the proximity of clients to particular servers in the pool.

A system with a pool of replicated servers such as that shown in FIG. 1 generally requires a mechanism for dispatching each incoming client request to an appropriate server in the pool. Many current web server systems implement a server-side dispatching mechanism which requires modification to web server code or the domain name server (DNS) system, or even specialized server-side hardware. FIG. 2 illustrates a typical server-side solution which may be implemented in the system 10. Incoming requests from the clients 12-i are supplied via Internet 16 to a dispatching mechanism 20 that resides at the site of the servers 14-1, 14-2 and 14-3 in the geographically co-located group 18. The dispatching mechanism 20 routes the requests to one of the servers in group 18 in accordance with a technique which attempts to provide an optimal distribution of the request load across the servers.

A significant problem with server-side dispatching of the type illustrated in FIG. 2 is that the dispatching mechanism itself can become a performance bottleneck as the client request load increases. Such a bottleneck cannot be addressed by simply increasing the number of replicated servers in the pool. Another significant problem is that conventional server-side techniques do not provide optimal performance in applications in which the servers are geographically distributed. Unfortunately, conventional client-side techniques have also been unable to provide adequate solutions to these problems. For example, a client-side approach described in C. Yoshikawa et al., "Using Smart Clients to Build Scalable Services," USENIX 1997 Annual Technical Conference, Jan. 6–10, 1997, Anaheim, Calif., pp. 105–117, uses a modified web browser to perform routing decisions at the client side. The browser downloads an applet which a service provider needs to implement to realize service-specific routing. Although this approach may alleviate the potential bottleneck of a server-side dispatching mechanism in certain applications, it can also create increased network congestion due to applet transmission and potential control messages between the applet and the servers. Another problem with conventional client-side techniques is that such techniques generally cannot achieve load balancing at the server site, i.e., cannot provide an optimal distribution of request load across the servers of a server pool.

SUMMARY OF THE INVENTION

The invention provides improved client-side techniques for processing client requests to a network service hosted by a pool of servers. In an illustrative embodiment of the invention, each client which accesses a web site or other service hosted by a distributed pool of servers has a dispatching mechanism associated therewith. The dispatching mechanism for a given client is implemented by a client agent which intercepts client requests generated by that client and routes them to particular ones of the servers in the pool. The client agent bases its routing decisions on address information regarding the individual servers of the pool, as well as performance data regarding processing of previous client requests directed to the service. The address information, and other site-specific information useful to the routing decision, may be retrieved by the client agent from a response to an initial client request directed to the service. The performance data may include, for example, end-to-end response times for servicing previous client requests directed to the service, and the client agent may route the client request so as to minimize an average end-to-end response time of multiple requests to the service. The client agent may also make use of a probabilistic routing strategy which favors more responsive servers while still ensuring that each of the servers in the pool periodically receives at least one client request. Such a strategy allows accurate performance data to be maintained for all of the servers in the pool.

In accordance with another aspect of the invention, a pricing manager associated with the server pool may be used to establish discount factors or other pricing information for each of the servers in the pool. This pricing information is communicated to the client agents and used in their routing decisions, so as to ensure that otherwise non-cooperating client agents will route their requests in a manner consistent with a target operating point established by the service provider. The discount factor for a given server reflects the relative sensitivity of the client agent to the responsiveness of that server, and the same set of discount factors may be used for each of the client agents that access the service. A given client agent then selects one of the servers for processing a particular client request based on performance data which includes an average response time of each of the servers multiplied by its corresponding discount factor. The discount factors may be adjusted in accordance with an adaptive algorithm which compares actual server load conditions to corresponding target load conditions. The discount factors or other pricing information may also be determined or updated in a distributed manner by the server agents.

The invention can deliver significantly improved performance in processing client requests, while imposing only minimal additional overhead. The invention also provides a number of other advantages over conventional server-side and client-side approaches. For example, an illustrative embodiment of a distributed server system configured in accordance with the invention: (a) supports transparent mapping for popular web sites that have well publicized server names; (b) gracefully scales with an increasing number of clients; (c) allows different clients to use customized routing strategies; (d) enables service providers to effectively control the utilization of individual servers; (e) allows for addition, removal, and migration of servers, and allows these changes to be reflected as quickly as possible; (f) detects non-responsive servers and transparently redirects requests to other replicated servers in the server pool; (g) quickly reincorporates previously non-responsive servers which become available again; (h) takes advantage of differences in network delay between a client and individual servers of a distributed server pool while still accommodating dynamic changes in network performance and server load; (i) does not require any changes to existing client or server code; (j) does not require the generation of control messages; and (k) conforms to existing standards.

DETAILED DESCRIPTION OF THE INVENTION

The present invention will be illustrated below in conjunction with an exemplary computer system in which client-server connections are established over the Internet using the Transmission Control Protocol/Internet Protocol (TCP/IP) standard. It should be understood, however, that the invention is not limited to use with any particular type of system, network or communication protocol. The disclosed techniques are suitable for use with a wide variety of other networks and protocols. The term "web" as used herein is intended to include the World Wide Web, other portions of the Internet, or other types of communication networks. The term "client request" refers to any communication from a client which includes a request for information from a server. A given request may include multiple packets or only a single packet, depending on the nature of the request. The term "document" as used herein is intended to include web pages, portions of web pages, computer files, or any other type of data including audio, video and image data. The term "client agent" refers to any mechanism, implemented in hardware, software, or a combination of hardware and software, that acts to process information characterizing at least a portion of a server pool. A client agent in accordance with the invention operates on behalf of one or more particular clients, and processes client requests so as to benefit the corresponding client or clients. This is in contrast to conventional request-processing mechanisms which, for example, distribute requests without regard to the identity of the originating client. A client agent in accordance with the invention may be incorporated into or otherwise co-located with a corresponding client computer or other client machine, or may be a remote mechanism which is associated with the client but not co-located therewith. Similarly, a server agent in accordance with the invention may, but need not, be co-located with its corresponding server.

Figure 1:
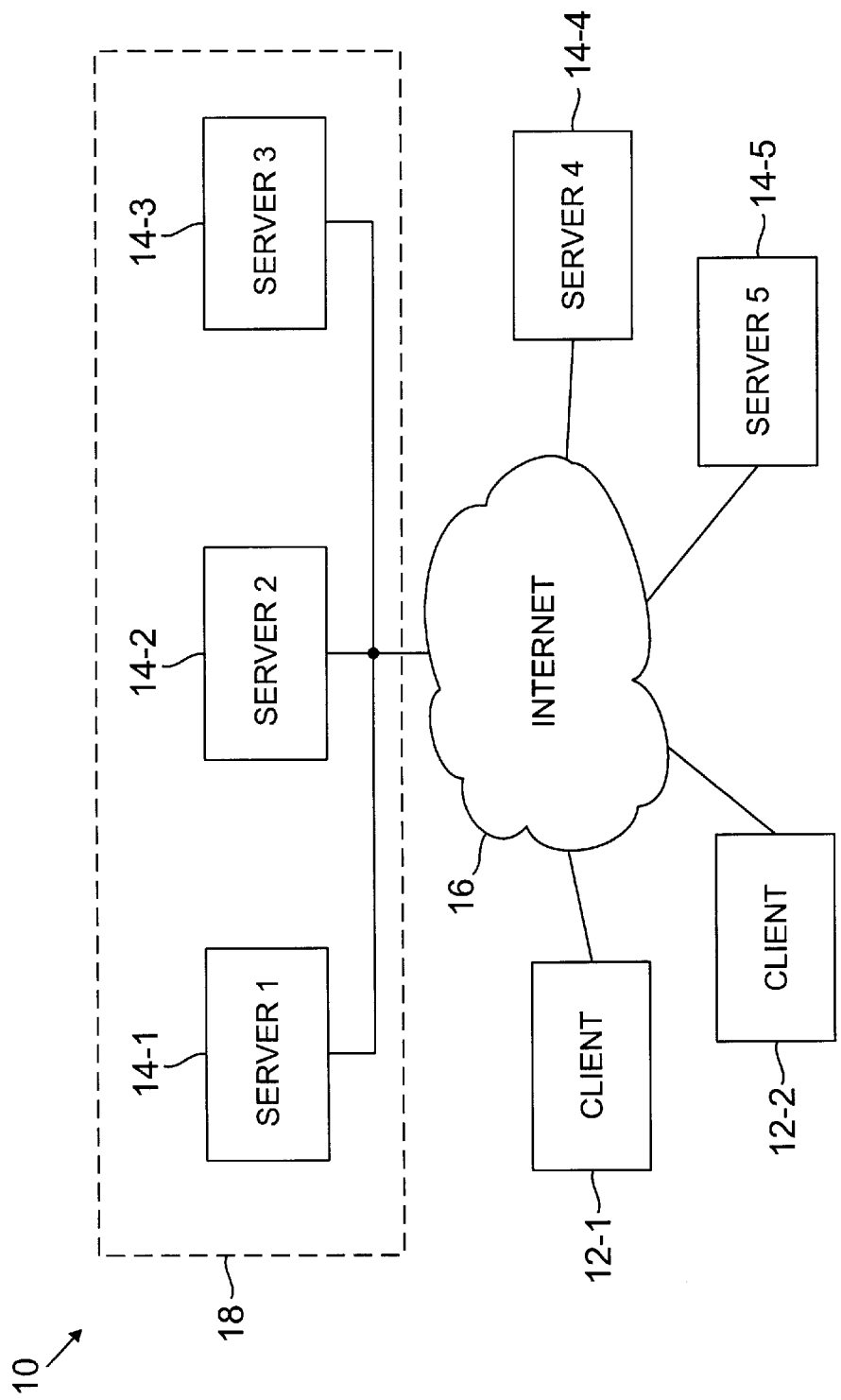
FIG. 1 is a block diagram of a conventional client-server system with geographically distributed servers.
Figure 2:
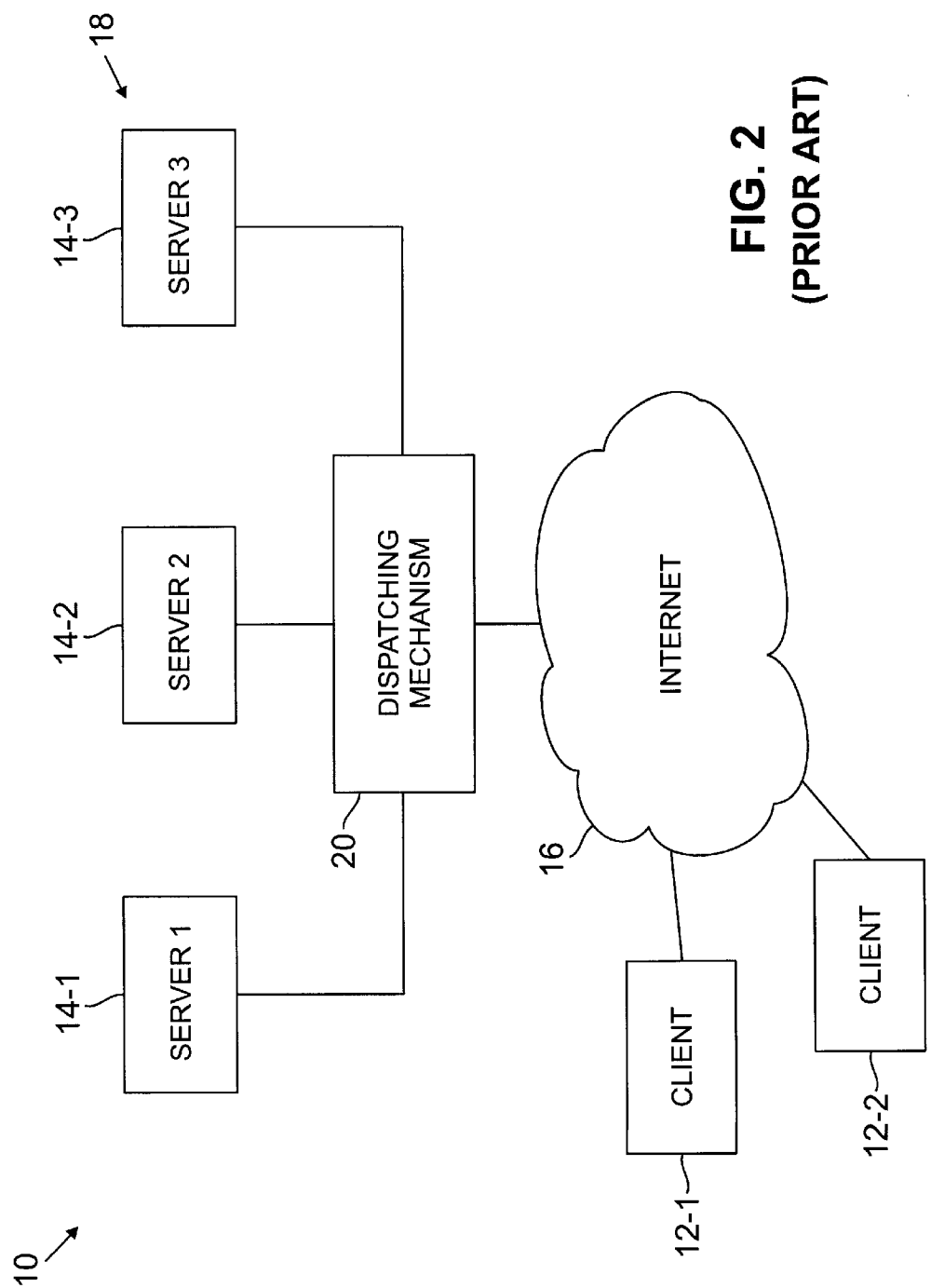
FIG. 2 is a block diagram of a conventional client-server system which utilizes a server-side technique for distributing client requests to servers.
Figure 3A:
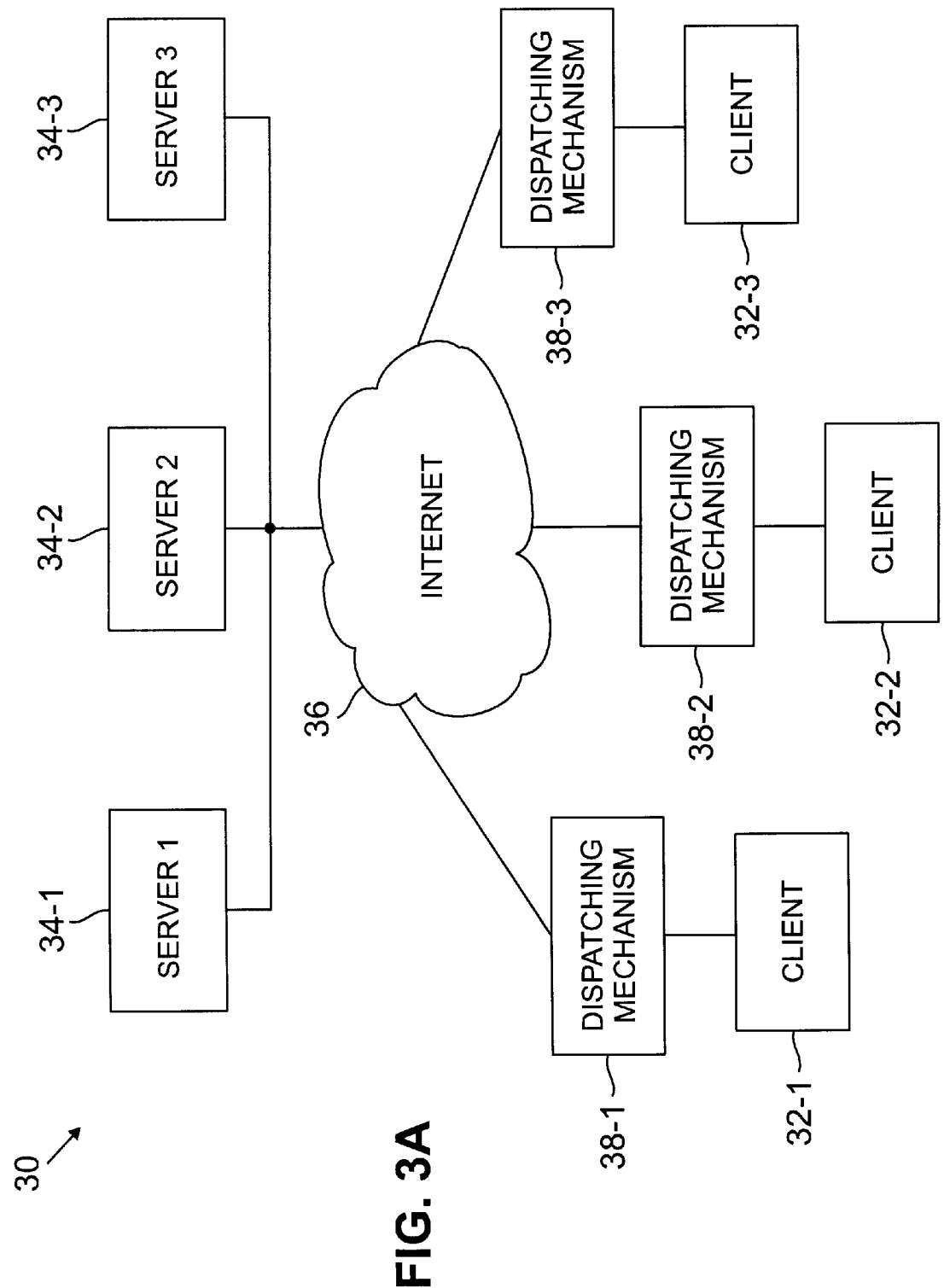
FIG. 3A is a block diagram of client-server system in accordance with the invention which utilizes a client-side technique for distributing client requests to servers.

FIG. 3A shows a distributed server computer system 30 in accordance with an illustrative embodiment of the invention. The system 30 includes a number of clients 32-i which communicate with servers 34-j over a communication network 36 such as the Internet. The system 30 is suitable for implementing Hypertext Transfer Protocol (HTTP)-based network services over the network 36. The HTTP protocol is described in greater detail in "Hypertext Transfer Protocol—HTTP/1.0," Network Working Group, May 1996, <http://www.ics.uci.edu/pub/ietf/http>, which is incorporated by reference herein. The clients 32-i and servers 34-j communicate over TCP/IP connections established over the network 36 in a conventional manner. For example, a client 32-i may generate an HTTP request for a network service hosted by the servers 34-j, such as a request for information associated with a particular web site, and a TCP/IP connection is then established between the client 32-i and one of the servers 34-j in the server system 30. The requested network service may be designated by a uniform resource locator (URL) or other suitable host name identifying the web site hosting the service.

Figure 3B:
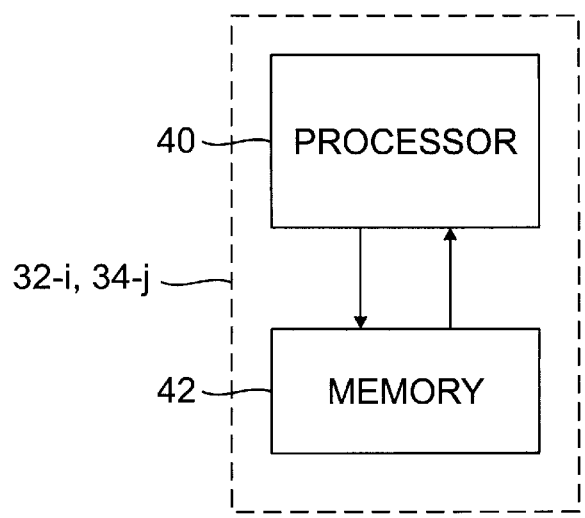
FIG. 3B is a block diagram of an exemplary client or server in the system of FIG. 3A.

The servers 34-j in the system 30 represent a pool of replicated servers corresponding to a particular web site. In this illustrative embodiment, the server pool includes three distinct servers 34-1, 34-2 and 34-3 arranged as shown. The servers 34-1, 34-2 and 34-3 may be George located or geographically distributed. Each of the servers 34-j may have an IP number or other suitable identifier associated therewith. At least one of the servers 34-j may be known to a standard DNS system by a logical address in the form of the above-noted host name. It will be assumed for purposes of illustration that the service content available at the web site is replicated on each of the servers 34-j and that each of the servers knows the IP numbers of all the other servers in the pool. This type of arrangement might be achieved through mirroring or with a distributed file system, as described in, for example, J. H. Howard et al., "Scale and Performance in a Distributed File System," ACM Transactions on Computer Systems, 6(1):51–81, February 1988, which is incorporated by reference herein. It will also be assumed that as long as the replicated service content is available on one of the servers 34-j, the clients 32-i will be able to access the service. It should be understood that the system 30 could include any arrangement or number of clients 32-i and servers 34-j. As shown in FIG. 3B, each of the clients 32-i and servers 34-j may include a processor 40 and a memory 42. The processor 40 and memory 42 may be utilized to execute software programs implementing processing techniques to be described in greater detail below.

In accordance with the invention, the clients 32-i in system 30 are each responsible for routing individual requests to appropriate ones of the servers 34-j. Each of the clients 32-i therefore has a dispatching mechanism 38-i associated therewith. The dispatching mechanism 38-i associated with a given client is responsible for routing requests generated by that client to one of the servers 34-i in the server pool. Although shown as a separate element in FIG. 3A, the dispatching mechanism 38-i may be implemented in the form of a client agent software module or other type of software stored in memory 42 and executed by processor 40 in the client. Alternatively, the dispatching mechanism may be in the form of a stand-alone client agent which is implemented on a machine configured to include a processor and memory in a manner similar to that shown in FIG. 3B. An exemplary client agent in accordance with the invention may: (1) intercept requests generated by the corresponding client; (2) store address information about the individual servers 34-j; (3) collect dynamic performance data, e.g., network conditions, server load, and other server site-specific information; (4) make routing decisions based on this dynamic performance data; (5) forward a request to a selected server, receive the response, and deliver it to the client; and (6) transparently redirect a request to an alternate server if the selected server is not responsive. A server agent software module may be associated with each of the servers 34-j. The server agent provides the above-noted address information to the client agent. In addition, it can also communicate other site-specific information to control access to the server pool, to support charging for services, and so forth, as will be discussed in greater detail below.

Routing strategies implemented by client agents in the dispatching mechanisms 38-i of FIG. 3A will now be described. The combination of the stateless nature of HTTP and the fact that many web pages contain several images and frames often results in the generation of several requests to retrieve a single web page. The above-described client agents measure the total response time for each such request. The total response time measured corresponds to the total end-to-end delay which includes connection establishment, network delay, and server response time. The client agents in accordance with the invention strive to minimize this total delay. Each client agent makes routing decisions based on the average response time of each server. These averages are estimated using the measured response times for the N most recent requests. The updated routing strategy is used to direct the next N requests to the appropriate servers in the server pool. Alternatively, the client agent could estimate the average response times by sending occasional probes at the cost of increased network traffic.

Although the client agents could employ a simple routing strategy such as always contacting the most responsive server in the pool, this type of strategy will generally fail to collect new performance data for the slower servers. Instead, a probabilistic routing strategy can be used to ensure that client agents collect new performance data for all or substantially all servers in the pool. More specifically, if $T_{mi}$ denotes the average response time for requests routed from client m to server i, then routing of the next N requests may be based on the following probability distribution:

$$p_{mi} = \frac{1/T_{mi}^k}{\sum_j 1/T_{mj}^k}, \quad (1)$$

here $k \geq 0$ is a constant. For a value of k=0, requests are routed to the servers randomly, without taking into account their performance. For a value of k=1, a linear distribution can be achieved. This will favor fast servers while still using slower ones. However, the overall performance might suffer due to possibly long delays from slow servers. By further increasing k, more requests will be routed to the most responsive servers. As k approaches infinity, all requests will be routed to the most responsive servers. Very high routing probabilities for the fastest servers will cause very infrequent usage of slower ones, which in turn will decrease the potential to quickly detect improved servers. The invention may be implemented with a minimum threshold to circumvent this possibility.

Although the above-described routing strategies base routing decisions on the measured response times for the N most recent requests, many alternative strategies may also be used. One example of an alternative routing strategy is based on weighted averages. In such a strategy, when estimating the performance of a particular server, more recent data should influence the overall performance estimate more than older data. The estimates may also be updated more frequently. Another example of an alternative routing strategy is based on time-of-day or other similar criteria. Network conditions and server usage generally vary with the time-of-day or the day of the week, and this information can be considered in the routing strategy. A significant advantage of the present invention is that it allows different clients to use different routing strategies. A set of different routing strategies can therefore be provided to allow the clients to adapt dynamically to changing conditions.

The above-described client agents also perform name resolution functions. As noted previously, a service hosted by the server pool may be identified by a logical address in the form of a host name. In a conventional system, when a client generates a request for the service, a standard DNS system transparently resolves the host name to an IP number which is used to establish the connection. In a system configured in accordance with the invention, a one-to-many mapping is provided from the host name to the IP numbers of the servers in the server pool, so as to allow a client to contact a particular server in the server pool in a transparent manner. This name resolving functionality may be implemented by the client agents. For example, the client agents may maintain a cache of logical host names and corresponding IP numbers to perform the one-to-many mapping using address information provided by server agents. When a client agent attempts to access a server for which it does not have a mapping cached, it uses standard DNS name resolving and contacts the server agent at that logical address. The server agent uses its corresponding server to generate the response and includes as part of the response the addresses of all of the individual servers in the pool. The client agent extracts the addresses from the response and creates an entry in its cache. Future requests to this server pool use this stored address information to perform the one-to-many mapping from the host name to the individual servers.

The standard DNS system is thus used in this embodiment only for bootstrapping from the host name to obtain address information for all the servers of the corresponding pool. Once a mapping for a logical address is cached, the DNS system is not needed to access any of the particular servers in the pool. Client agents need to use the DNS to retrieve the addresses of the individual servers only to create an initial entry. To avoid unnecessary transmission of address information, client agents may include a timestamp in their requests which indicates the state of the currently cached mapping for the given server pool. Upon receipt of a request, each server agent inspects this timestamp and includes the addresses in the response only if more up-to-date address information is available. This is similar in some respects to the HTTP If-modified-since header, which is used to avoid retrieving cached files which have not been modified until a certain date.

It should be noted that HTTP allows application-specific header fields and requires that all intermediaries such as proxies or gateways conforming to HTTP ignore these and forward them unchanged. The present invention utilizes this aspect of HTTP to "piggyback" timestamps, addresses or other information in HTTP messages. The invention provides the following new message headers: Replica-Date and Replica-Addresses. Client agents use the Replica-Date header to tell server agents the status of their cached addresses for the server pool at issue. Server agents use both headers to return a list of addresses and a timestamp indicating when this information was updated.

The above-described mapping from host name to IP numbers can be readily extended to a mapping from a more general logical address, e.g., host name+port number, to a more general IP address, e.g., IP number+port number, so as to accommodate usage of different port numbers. This generally requires that the address information included in responses be extended to contain port numbers as well as host names. Similarly, the mapping can accommodate a path offset. For example, the host name, port number and path offset in the logical address "www.yahoo.com:80/" can be mapped to the host name, port number and path offset in the logical address "www.cs.nyu.edu:8888/yahoo/." In the first logical address, the server is accepting connections at port 80 and the directory structure is rooted at "/." In the second logical address, the server accepts connections at port 8888 and the root directory is rooted at "/yahoo/." This feature is useful in applications in which replicated servers use different root directories and require a relative path offset.

Figure 4:
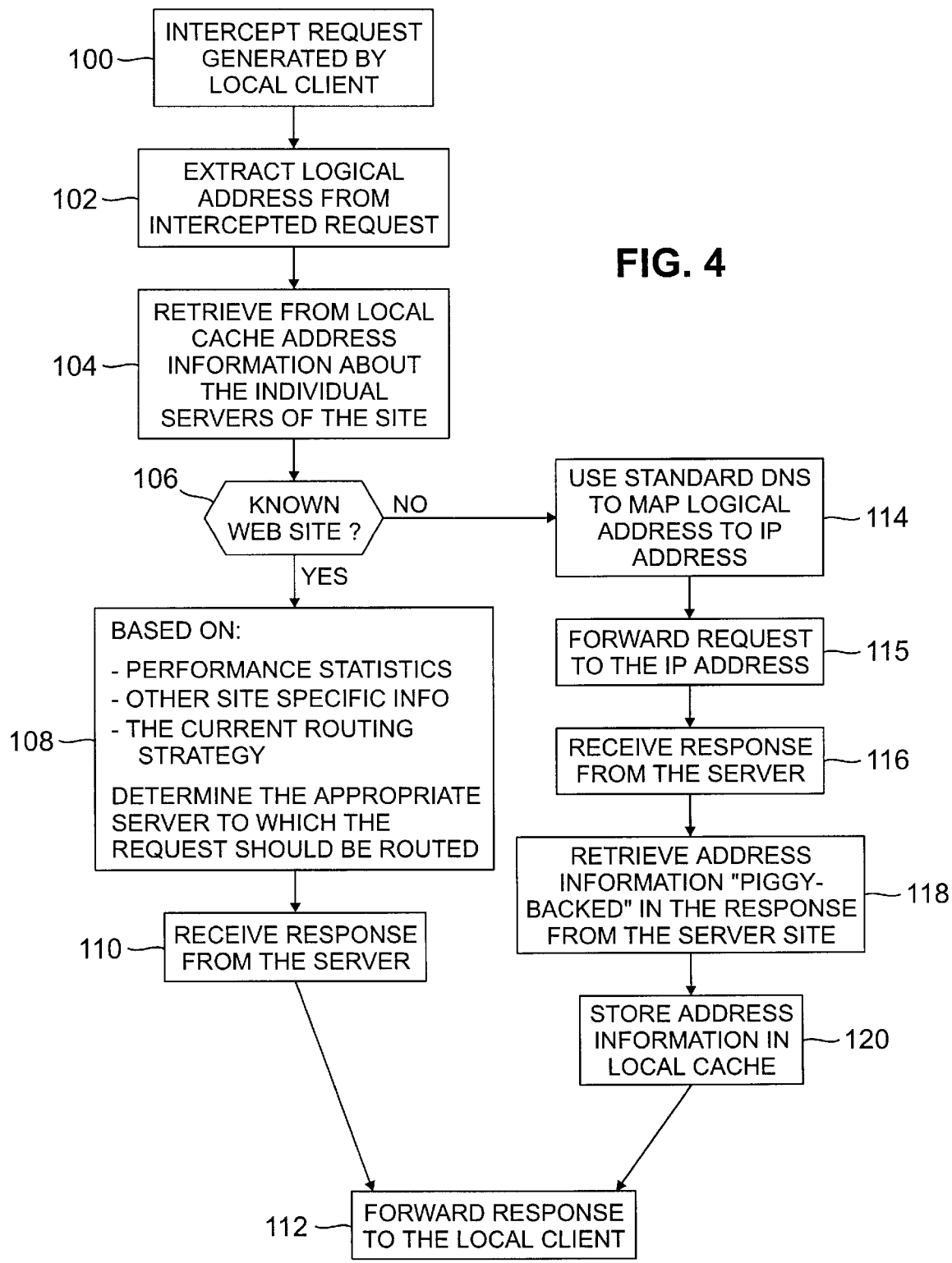
FIG. 4 is a flow diagram illustrating the operation of a client agent which may be implemented in the system of FIG. 3A in accordance with the invention.

FIG. 4 is a flow diagram illustrating the operation of a client agent in accordance with the invention. In step 100, the client agent intercepts a request generated by its corresponding client (also referred to as the "local" client). The request is for a web site or other network service hosted by a server pool and identified by a host name or other logical address. In step 102, the client determines the logical address of the web site to which the request is directed, and in step 104 attempts to retrieve information from its local cache regarding the individual servers associated with the web site. If the web site is already known to the client agent, the attempt to retrieve information in step 104 will be successful, and decision block 106 indicates that the process then moves to step 108. In step 108, the client agent determines the appropriate server to which the request should be routed, and routes the request to this server. This determination may be based on performance statistics, other site-specific information, and the currently-implemented routing strategy. In step 110, the response is received from the server, and in step 112 the client agent forwards the response to the local client.

If the web site is not known to the client agent, the attempt to retrieve information in step 104 will be unsuccessful, and decision block 106 indicates that the process then moves to step 114. In step 114, the client agent uses a standard DNS to map the logical address to an IP address, and in step 115 forwards the request to that IP address. In step 116, the client agent receives a response from the server identified by the IP address. The client agent in step 118 retrieves address information regarding the individual servers of the server pool. As previously described, this information may be "piggy-backed" in the response transmitted from the server site. The retrieved address information is then stored in the local cache associated with the client agent, as shown in step 120, and in step 112 the client agent forwards the response to the local client. For subsequent requests directed from the same client to the same IP address, the client agent will use the address information stored in its local cache for that web site to select one of the servers for processing the request.

A number of implementation issues relating to the above-described illustrative embodiment of the invention will now be addressed. As noted above, the illustrative embodiment utilizes a server agent module at the server side. This server agent functionality could be added to existing web servers in a straightforward manner while imposing little computational overhead. Alternatively, a stand-alone application may be used to implement the server agent functionality. Such an application may be configured to intercept every incoming request, forward it to the corresponding server, accept the response, add the address information to the response as needed, and forward it to the client agent.

Similarly, the client agent functionality could be added to existing web browsers in a straightforward manner, or alternatively a stand-alone application could be used to implement the required client agent functionality. For example, the client agent implementation may make use of the fact that virtually all existing web browsers support proxies to intercept requests. When a client agent is started up, it may create a server socket which accepts HTTP requests, in a manner similar to a proxy. By configuring the browser to use this "proxy," i.e., the client agent, the client agent can be made to effectively intercept each request. As noted previously, although a client agent in accordance with the invention may be incorporated into or otherwise co-located with the client machine, the client agent need not be implemented in this manner. For example, a given client agent may be implemented in a location remote from its corresponding client machine.

Proxies are generally used to allow Internet access through firewalls, and they also perform caching of web documents. A client agent in accordance with the invention can accommodate proxies in at least two ways. First, a client agent can be located between one or more clients and a proxy. Since name resolution is performed at the client agent, the proxy will treat identical documents from different servers of the same server pool as different documents and create redundant copies in its cache. Alternatively, the client agent can be located "behind" the proxy, i.e., between the proxy and the network, which avoids the problem of redundant copies in the proxy cache. Also, only one address cache and a single set of statistical data may be maintained for a number of users, potentially resulting in more up-to-date address caches and more accurate estimates.

Regardless of whether the client and server agents are implemented by modifying existing systems or as stand-alone applications, a system in accordance with the invention may be made backward compatible with regard to clients and servers lacking this functionality. For example, the above-described illustrative embodiment of the invention is backward compatible. A client equipped with a client agent may be used with a conventional HTTP server. The standard server simply ignores the timestamp header in a request from the client agent and services the request in the usual manner. The lack of address information in the resulting response tells the client that it is dealing with a standard server. The client agent can then react by, for example, marking this server as a standard server and infrequently including the timestamp in its future requests to this site in order to update its cache in case the server is upgraded; or including the timestamp in each request to ensure that its cache is updated as soon as possible. Moreover, a conventional client may be used with a server equipped with a server agent. A request received by a server agent will not contain a timestamp header if the client lacks the client agent functionality. The server can then react by, for example, servicing the request in a standard manner without including any address information in its response, or routing the request on behalf of the client to an individual server in the server pool. The latter approach is very similar in nature to conventional server-side solutions described previously.

Techniques for managing the server pool will now be described in greater detail. In accordance with the invention, the client agents may be non-cooperative, in the sense that they may make their routing decisions independently from each other, striving to optimize their individual performance. While each client can implement a routing strategy of its choice, in the illustrative embodiment client agents route requests to servers with minimal average response time. The operating point of the system in such an embodiment, i.e., the load distribution over the server pool, is therefore primarily the result of the interaction among the various client agents, and generally cannot be controlled by the service provider. However, a number of different strategies can be used at the server site to control the operating point of the system, while the client agents make their routing decisions in a non-cooperative manner.

The service provider generally aims at distributing the load currently offered to the server pool in a way that is deemed efficient from the point of view of the overall performance of the server pool in responding to client requests. The service provider, for example, might desire an operating point that minimizes the overall average response time of the server pool. In other cases, the provider might want to discourage usage of certain servers, even if they are the most responsive ones, in order to perform other site-specific tasks. Therefore, a mechanism is needed to make the distributed client agents implement routing strategies which lead to an operating point that coincides with one desired by the service provider.

The interaction among the various non-cooperative client agents can be modeled using concepts from game theory. An overview of game theoretic aspects in computer networking can be found in, for example, Y. A. Korilis et al., "Architecting Noncooperative Networks," IEEE Journal on Selected Areas in Communication, 13(7):1241–1251, September 1995, which is incorporated by reference herein. The operating points of the system may be viewed as Nash equilibria of the underlying control game. It should be noted that non-cooperative equilibria are inherently inefficient in that, when each client agent strives to optimize its individual performance, the overall behavior of the system is suboptimal.

The invention uses a pricing mechanism to provide incentives to the non-cooperative client agents to implement routing strategies that lead to a desired operating point in terms of load distribution over the server pool. Recent analytical studies in the area of networking have shown that a service provider can enforce any desired operating point by means of appropriate pricing strategies. See, for example, Y. A. Korilis et al., "Optimal Pricing Strategies in Noncooperative Networks," Proc. of the 5$^{th}$ International Conference on Telecommunication Systems: Modeling and Analysis, pp. 110–123, Nashville, Tenn., March 1997, and Y. A. Korilis et al., "Pricing Noncooperative Networks," <http://www.multimedia.bell-labs.com/people/yannisk/price.html>, 1997, both of which are incorporated by reference herein. An important aspect of this pricing mechanism is that there is a service cost associated with obtaining service from each server in the server pool. Client agents can therefore make their routing decisions based not only on performance statistics, but also on service cost information for each server. An assumption underlying this mechanism is that the client agents are indeed "sensitive" to service costs. This behavior can be expected in private intranets, where client agents and the pricing mechanism are part of the same management system. For external client agents accessing the web site, this behavior can be enforced by actual usage-based service charges, e.g., for commercial web sites, or by means of a limited electronic budget allocated to each client. When client agents are made sensitive to service costs by use of the pricing mechanism, the service provider can control not only the load distribution over the available servers, but also the total offered load itself.

In order to support the pricing mechanism, a server pool may be equipped with a pricing manager software module. In one embodiment, the pricing manager determines the service costs for access to each server of the pool, based on the targeted operating point, and communicates this pricing information to the corresponding server agent. The server agent then provides the pricing information about its server to the client agents that receive service from it. The goal of the pricing mechanism is avoidance of overload conditions at various servers, and to provide load balancing, i.e, distribution of the total load offered to the web site among the available servers in a way that is deemed efficient by the provider.

Figure 5:
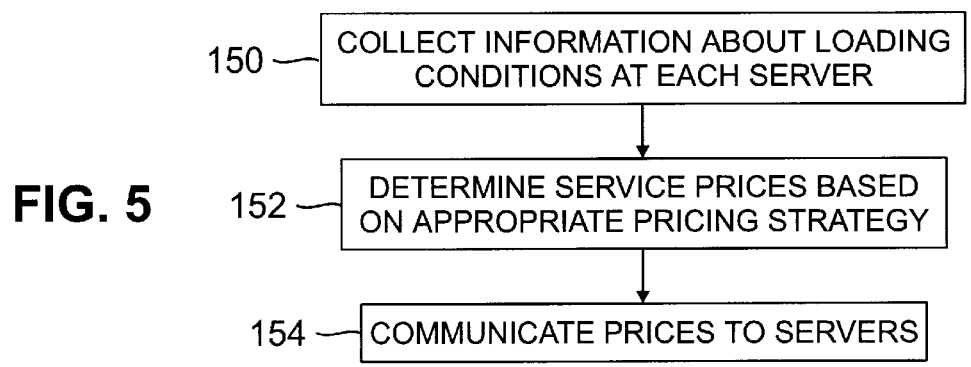
FIGS. 5 and 6 are flow diagrams illustrating the functionality of pricing managers which may be implemented in the system of FIG. 3A in accordance with the invention.

FIG. 5 is a flow diagram illustrating the general operation of an exemplary pricing manager in accordance with the invention. In step 150, the pricing manager collects information about loading conditions at each of the servers of the server pool. The pricing manager in step 152 then determines service prices based on an appropriate pricing mechanism. In step 154, the pricing manager communicates the prices to the servers of the server pool. Those servers can then communicate those prices in responses to client requests in the manner previously described. The pricing manager may be implemented using a software module stored in a memory of one of the servers of the pool, and executed by a processor associated with that server.

Figure 6:
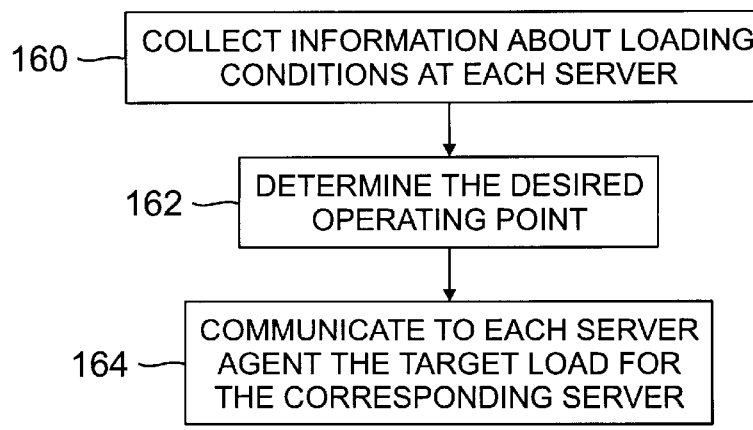

FIG. 6 illustrates the operation of one possible specific implementation of the general pricing manager described in conjunction with FIG. 5, for a case in which pricing information communicated to the client agents is determined in a distributed manner by the server agents. In step 160, the pricing manager collects information about loading conditions at each of the servers of the server pool. The pricing manager in step 162 then determines a desired operating point for the server pool. In step 164, the pricing manager communicates to each server agent pricing information in the form of a target request load for the corresponding server. As will be described in greater detail in conjunction with FIG. 7 below, the server agents can utilize the target loads to determine discount factors, and to keep the discount factors updated as requests are received and processed. These discount factors represent pricing information which is communicated by the server agents in responses to the client agents in the manner previously described. Like the pricing manager functions illustrated in conjunction with FIG. 5, the pricing manager functions illustrated in FIG. 6 may be implemented using a software module stored in a memory of one of the servers of the pool, and executed by a processor associated with that server.

The pricing mechanism in an illustrative embodiment of the invention may be based on analytical results described in the above-cited reference Y. A. Korilis et al., "Pricing Noncooperative Networks," for a system of general network resources accessed by a number of non-cooperative clients.

Each resource is characterized by its "capacity," i.e., the maximum load that can be accommodated by the resource. Overload conditions can be avoided through the use of congestion pricing: the service cost per size unit, i.e., the price, of each resource is made proportional to the congestion level at the resource that depends on the total load offered to it by the clients. More specifically, the price of each resource is given by a congestion function associated with the resource multiplied by a weight. These weights determine the relative sensitivity of the clients to the congestion level at the various resources, and will be referred to herein as discount factors. Load balancing can be achieved by appropriate choice of these discount factors. This pricing mechanism can allow the service provider to enforce any desired operating point while the clients make their routing decisions non-cooperatively.

The pricing mechanism may determine a discount factor for each server in the server pool. This discount factor determines the relative sensitivity of the client agents to the responsiveness of the server. It should be noted that the discount factor of each server is generally the same for all clients. The performance metric considered by each client agent in making its routing decisions may be the average response time of each server multiplied by the corresponding discount factor. Therefore, if $w_i$ is the discount factor of server i and $T_{mi}$ the average response time from the server to client agent m, then the routing strategy of the client agent described by Equation (1) above becomes:

$$p_{mi} = \frac{1/(w_i T_{mi})^k}{\sum_j 1/(w_j T_{mj})^k}, \quad (2)$$

The server discount factors $w_i$ may be determined by the pricing manager based on the operating point that the service provider wants to enforce, or in a distributed manner by the server agents. One possible way to determine these factors would be to map the parameters of the model considered in the above-cited reference Y. A. Korilis et al., "Pricing Noncooperative Networks,", to the characteristics of the invention and apply the corresponding analytical results, expecting to achieve a good approximation of the desired operating point. Alternatively, the factors may be implemented using an adaptive algorithm, such as that proposed in the latter Y. A Korilis et al. reference, that does not depend on the details of the underlying analytical model. This adaptive algorithm updates the discount factors iteratively, based on the "distance" of the current operating point from the desired one.

If $f_i^*$ denotes the desired load at server i and $f_i(n)$ the actual load offered to server i during the nth iteration of the algorithm, then its discount factor $w_i$ is updated using the following equation:

$$w_i(n+1) = w_i(n) e^{\theta_i(f_i(n) - f_i^*)}, \quad (3)$$

where $\theta_i > 0$ is a constant that determines the rate of change in the discount factor $w_i$ of server i. The idea behind this adaptive algorithm is that, if the server is currently receiving less load than the desired one, its discount factor should be decreased. This makes the clients less sensitive to the congestion level at the server, thus encouraging them to direct more of their requests to the server. Similarly, if the server receives more load than the desired one, its discount factor is increased. Under a set of general assumptions, guaranteeing that the client population as a total reacts "rationally" to price changes, such an iterative scheme was shown in the latter Y. A. Korilis reference to drive the system to the desired operating point.

Figure 7:
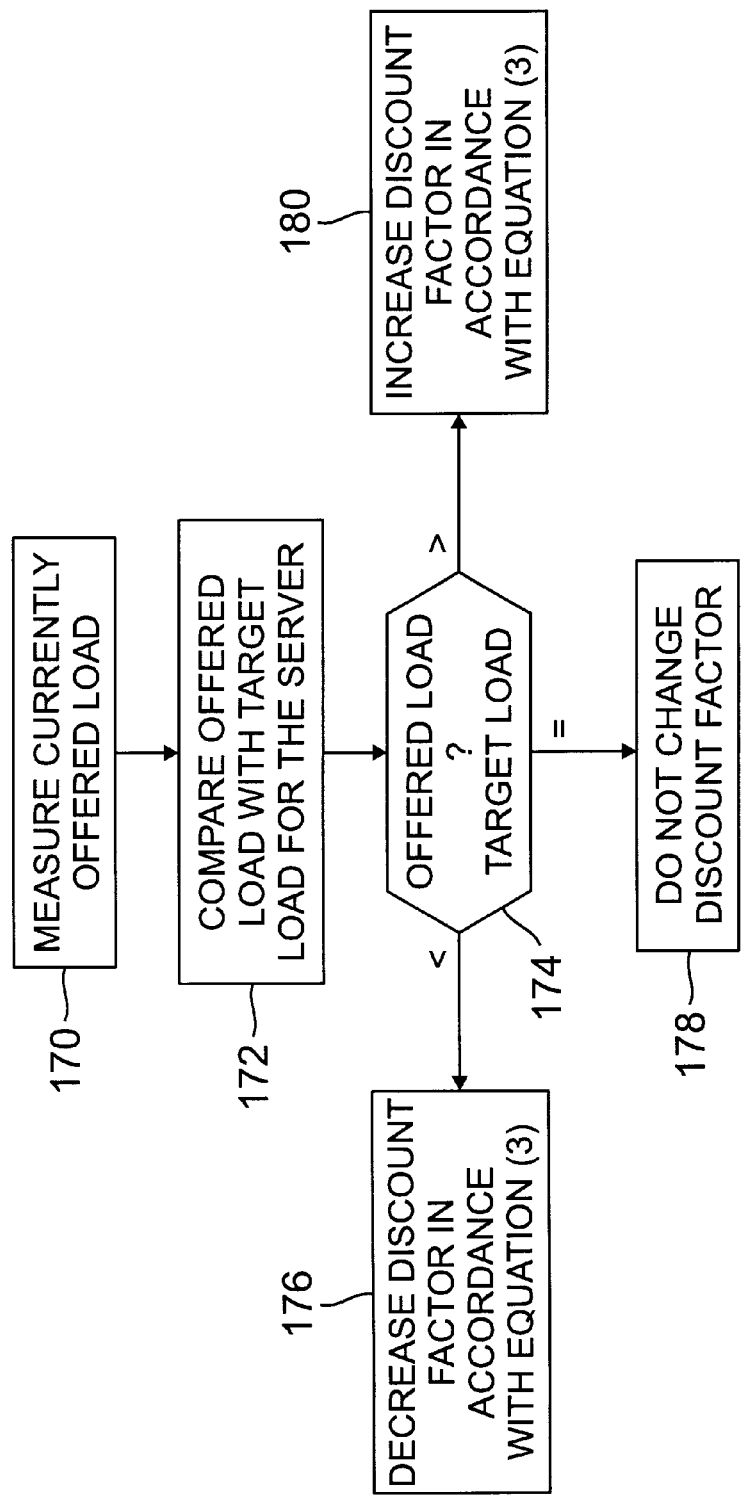
FIG. 7 is a flow diagram illustrating an adaptive algorithm for updating a discount factor associated with a server in the system of FIG. 3A.

FIG. 7 is a flow diagram illustrating one possible implementation of the above-described adaptive algorithm. In step 170, the currently offered load is measured for a given server of the server pool. The currently offered load is then compared with the target load for that server in step 172. Based on the relative values of the offered load and the target load, decision block 174 determines the manner in which the discount factors are adjusted. If the offered load is less than the target load, the discount factor is decreased in accordance with Equation (3), as shown in step 176. If the offered load is equal to the target load, the discount factor remains unchanged, as shown in step 178. If the offered load is greater than the target load, the discount factor is increased in accordance with Equation (3), as shown in step 180. The process steps shown in FIG. 7 are repeated for each iteration of the adaptive algorithm. The algorithm may be implemented by the previously described pricing manager, or in a distributed manner by the server agents.

In the above-described illustrative embodiment of the invention, server load is expressed in requests per unit of time. Considering the nature of HTTP requests, it may be expected that each client will generate a large number of requests of small to moderate size. Therefore, this is a satisfactory approximation. Alternative embodiments of the invention may utilize a more complex load metric, such as one which considers the actual size of each request.

The pricing manager implemented at the server site periodically collects information about the load offered to each server in the pool by contacting the corresponding server agent, updates the discount factors according to Equation (3) and communicates the updated discount factors to the server agents. Each server agent receives only the update of its associated server and is responsible for communicating it to the client agents. This may be achieved in a manner previously described, for example, by piggybacking the discount factor of the server to HTTP messages that contain the responses to the client requests.

As previously noted, the pricing mechanism may also be implemented in a distributed manner. Equation (3) above indicates that the discount factor of each server is determined using only local information, i.e., the difference between the load currently offered to that server and the targeted load. Therefore, the adaptive algorithm is well suited for a distributed implementation such as that described in conjunction with FIG. 6 above. If the server agent is cognizant of the desired load at the server, i.e., $f_i^*$ in Equation (3), then it can update the discount factor of the server without contacting the pricing manager. Note, however, that the target load (in requests per time unit) typically depends on the total load offered to the web site, which is information that is generally only available to the pricing manager. If the total offered load is not expected to change dramatically, the pricing manager can inform the server agents about their target load less frequently. Then, each server agent uses Equation (3) to update its discount factor on a faster time scale.

The above-described embodiments of the invention are illustrative only. Numerous alternative embodiments within the scope of the following claims will be readily apparent to those skilled in the art.

What is claimed is:

1. A method of processing a client request directed from a client to a service hosted by a pool of servers, the method comprising the steps of:

intercepting a client request directed to the service hosted by the server pool; and selecting a particular one of the servers in the server pool to which to route the client request based on address information and performance data regarding the servers, wherein at least a portion of the address information and the performance data is gathered by a given client agent associated with the client, the given client agent gathering the portion of the address information and the performance data by processing responses to one or more previous client requests generated by the corresponding client and directed by the client agent to servers of the server pool using a routing strategy which ensures that each of the servers in the server pool receives at least one client request, and further wherein the selecting step utilizes additional information received from an entity associated with the server pool such that a plurality of otherwise non-cooperating client agents including the given client agent route their requests in accordance with a target operating point for the server pool.

2. The method of claim 1 wherein the intercepting and selecting steps are implemented in the client agent associated with the client.

3. The method of claim 1 wherein upon an initial client request to the service hosted by the server pool, the client agent retrieves the address information from a response to the initial request received from a server in the server pool.

4. The method of claim 1 wherein the selecting step includes selecting a particular one of the servers based on performance data which includes performance data regarding a network over which the client requests are sent.

5. The method of claim 1 wherein the selecting step includes selecting a particular one of the servers based on performance data which includes average response times for at least a subset of the servers.

6. The method of claim 5 wherein the average response times are determined by monitoring previous client requests directed to the service.

7. The method of claim 6 wherein the average response time for at least one of the servers includes a weighted average response time, wherein more recent responses are weighted more heavily than less recent responses.

8. The method of claim 5 wherein the average response times are determined by utilizing probe messages sent by the client agent to the servers.

9. The method of claim 1 wherein the selecting step includes selecting a server in the server pool in accordance with a probabilistic routing strategy which routes client requests such that a server in the pool which provides the fastest response is more likely to receive subsequent client requests than a server in the pool which provides a slower response.

10. The method of claim 9 wherein the probabilistic routing strategy routes multiple client requests such that at least one client request is directed to each of the servers in the pool.

11. The method of claim 1 further including the step of delivering the address information and other server-site specific information to the client agent by a server agent associated with the server pool.

12. The method of claim 11 wherein the server agent determines whether the address information used by the client agent to route the client request is outdated by examining a timestamp transmitted by the client agent with the client request.

13. The method of claim 11 wherein the server agent provides updated address information in its response to the client request if it determines that the address information used by the client agent to route the request is outdated.

14. The method of claim 1 further including the step of transmitting at least a portion of the additional information in the form of pricing information to the client agent, wherein the pricing information establishes a service price associated with each of at least a subset of the servers in the server pool, based on the target operating point for the server pool.

15. The method of claim 14 wherein at least a portion of the pricing information is generated by a pricing manager and transmitted from the pricing manager to a server agent and from the server agent to the client agent.

16. The method of claim 14 wherein at least a portion of the pricing information is generated by server agents associated with the servers and transmitted from the server agents to the client agent.

17. The method of claim 14 wherein the pricing information includes a discount factor for each of the servers in the pool, and the discount factor for a given server reflects the relative sensitivity of the client agent to the responsiveness of that server.

18. The method of claim 17 wherein the selecting step includes selecting one of the servers based on performance data which includes an average response time of each server multiplied by its corresponding discount factor.

19. The method of claim 17 further including the step of updating the discount factors in accordance with an adaptive algorithm.

20. The method of claim 17 wherein a single set of discount factors are supplied to each of a plurality of client agents processing client requests directed to the service hosted by the server pool.

21. An apparatus for processing a client request directed to a service hosted by a pool of servers, the apparatus comprising:

a processor for implementing a given client agent which is operative to intercept a client request directed from a corresponding client to the service hosted by the server pool, and to select a particular one of the servers in the server pool to which to route the client request based on address information and performance data regarding the servers, the given client agent gathering at least a portion of the address information and the performance data by processing responses to one or more previous client requests generated by the corresponding client and directed by the client agent to servers of the server pool using a routing strategy which ensures that each of the servers in the server pool receives at least one client request, wherein the server selection operation further utilizes additional information received from an entity associated with the server pool such that a plurality of otherwise non-cooperating client agents including the given client agent route their requests in accordance with a target operating point for the server pool; and a memory associated with the processor for storing at least a portion of the address information and performance data.

22. The apparatus of claim 21 wherein at least a portion of the performance data is gathered by the client agent.

23. The apparatus of claim 21 wherein the processor is implemented at least in part within the client.

24. The apparatus of claim 21 wherein the processor is co-located with the client.

25. The apparatus of claim 21 wherein the processor is directly coupled to the client.

26. The apparatus of claim 21 wherein upon an initial client request to the service hosted by the server pool, the client agent retrieves the address information from a response to the initial request received from a server in the server pool.

27. The apparatus of claim 21 wherein the processor is operative to select a particular one of the servers based on performance data which includes performance data regarding a network over which the client requests are sent.

28. The apparatus of claim 21 wherein the processor is operative to select a particular one of the servers based on performance data which includes average response times for at least a subset of the servers.

29. The apparatus of claim 28 wherein the average response times are determined by monitoring previous client requests directed to the service.

30. The apparatus of claim 29 wherein the average response time for at least one of the servers includes a weighted average response time, wherein more recent responses are weighted more heavily than less recent responses.

31. The apparatus of claim 28 wherein the average response times are determined by utilizing probe messages sent by the client agent to the servers.

32. The apparatus of claim 21 wherein the client agent is operative to select a server in the server pool in accordance with a probabilistic routing strategy which routes client requests such that a server in the pool which provides the fastest response is more likely to receive subsequent client requests than a server in the pool which provides a slower response.

33. The apparatus of claim 32 wherein the probabilistic routing strategy routes multiple client requests such that at least one client request is directed to each of the servers in the pool.

34. The apparatus of claim 21 wherein the address information and other server-site specific information are delivered to the client agent by a server agent associated with the server pool.

35. The apparatus of claim 21 wherein client agent transmits a timestamp with the client request, such that a server agent associated with the server pool can determine whether the address information used by the client agent to route the client request is outdated.

36. The apparatus of claim 21 wherein the client agent is operative to retrieve updated address information for the servers of the server pool from a response to the client request.

37. The apparatus of claim 21 wherein the client agent is further operative to receive at least a portion of the additional information in the form of pricing information associated with the server pool, wherein the pricing information establishes a service price associated with each of at least a subset of the servers in the server pool, based on the target operating point for the server pool.

38. The apparatus of claim 37 wherein at least a portion of the pricing information is generated by a pricing manager and transmitted from the pricing manager to a server agent and from the server agent to the client agent.

39. The apparatus of claim 37 wherein at least a portion of the pricing information is generated by server agents associated with the servers and transmitted from the server agents to the client agent.

40. The apparatus of claim 37 wherein the pricing information includes a discount factor for each of the servers in the pool, wherein the discount factor for a given server reflects the relative sensitivity of the client agent to the responsiveness of that server.

41. The apparatus of claim 40 wherein the client agent selects one of the servers based on performance data which includes an average response time of each server multiplied by its corresponding discount factor.

42. An apparatus for processing a client request directed to a service hosted by a pool of servers, comprising:

means for intercepting a client request directed to the service hosted by the server pool; and means for selecting a particular one of the servers in the server pool to which to route the client request based on address information and performance data regarding the servers, wherein at least a portion of the address information and the performance data is gathered by a given client agent associated with the client, the given client agent gathering the portion of the address information and the performance data by processing responses to one or more previous client requests generated by the corresponding client and directed by the client agent to servers of the server pool using a routing strategy which ensures that each of the servers in the server pool receives at least one client request, and further wherein the selecting means utilizes additional information received from an entity associated with the server pool such that a plurality of otherwise non-cooperating client agents including the given client agent route their requests in accordance with a target operating point for the server pool.

43. A method of processing a client request directed from a client to a service hosted by a pool of servers, the method comprising the steps of:

generating pricing information which establishes a service price associated with each of at least a subset of the servers in the server pool, based on a target operating point for the server pool; and transmitting the pricing information to the client, such that a client agent associated with the client is enabled to select a particular one of the servers in the server pool to which to route the client request based at least in part on the pricing information, the client agent gathering address information and performance data used in the select operation by processing responses to one or more previous client requests generated by the client and directed by the client agent to servers of the server pool using a routing strategy which ensures that each of the servers in the server pool receives at least one client request.

44. The method of claim 43 wherein at least a portion of the pricing information is generated by a pricing manager associated with the server pool and transmitted from the pricing manager to a client agent associated with the client.

45. The method of claim 43 wherein at least a portion of the pricing information is generated by server agents associated with the servers and transmitted from the server agents to a client agent associated with the client.

46. The method of claim 43 wherein the pricing information includes a discount factor for each of the servers in the pool, wherein the discount factor for a given server reflects the relative sensitivity of the client agent to the responsiveness of that server.

47. A method of processing a client request directed from a client to a service hosted by a pool of servers, the method comprising the steps of:

intercepting a client request directed to the service hosted by the server pool; and selecting a particular one of the servers in the server pool to which to route the client request based on address information and performance data regarding the servers, wherein the intercepting and selecting steps are implemented in a client agent associated with the client, the client agent gathering at least a portion of the address information and the performance data by processing responses to one or more previous client requests generated by the corresponding client and directed by the client agent to servers of the server pool using a routing strategy which ensures that each of the servers in the server pool receives at least one client request, and further wherein the selecting step utilizes additional information received from an entity associated with the server pool such that a plurality of otherwise non-cooperating client agents including the given client agent route their requests in accordance with a target operating point for the server pool.

* * * * *